(12) United States Patent
Rokosky et al.

(10) Patent No.: US 11,729,311 B2
(45) Date of Patent: *Aug. 15, 2023

(54) AUTOMATIC DISTRIBUTION OF INMATE PHONE RECORDINGS

(71) Applicant: DSI-ITI, INC., Reston, VA (US)

(72) Inventors: James P. Rokosky, Altoona, PA (US);
Thomas C. Gerlach, Altoona, PA (US);
Anthony R. Bambocci, Altoona, PA (US)

(73) Assignee: DSI-ITI, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,688

(22) Filed: Oct. 1, 2021

(65) Prior Publication Data

US 2022/0094781 A1 Mar. 24, 2022

Related U.S. Application Data

(63) Continuation of application No. 16/525,159, filed on Jul. 29, 2019, now Pat. No. 11,140,262, which is a
(Continued)

(51) Int. Cl.
*H04M 3/42* (2006.01)
*H04M 3/22* (2006.01)
(Continued)

(52) U.S. Cl.
CPC ........ *H04M 3/42221* (2013.01); *H04L 51/08* (2013.01); *H04L 67/02* (2013.01);
(Continued)

(58) Field of Classification Search
None
See application file for complete search history.

(56) References Cited

U.S. PATENT DOCUMENTS

| | | |
|---|---|---|
| 4,054,756 A | 10/1977 | Comella et al. |
| 4,191,860 A | 3/1980 | Weber |

(Continued)

OTHER PUBLICATIONS

"Bellcore Notes on the Networks (Formerly BOC Notes on the LEC Networks)," Bellcore, Special Report SR-2275, Issue 3, Dec. 1997.
(Continued)

*Primary Examiner* — Hemant S Patel
(74) *Attorney, Agent, or Firm* — Sterne, Kessler, Goldstein & Fox P.L.L.C.

(57) ABSTRACT

Embodiments for automatically distributing phone call recordings to interested parties generally include associating one or more forwarding criteria with each of one or more interested parties, establishing a phone call from a calling party to a destination number through an institutional phone system, recording the phone call, and, if the phone call satisfies one or more forwarding criteria associated with one or more interested parties, automatically distributing the recording of the phone call to the at least one interested party associated with the satisfied one or more forwarding criteria. Distribution may be by e-mail, by uploading the recording to a website that interested parties (and preferably only interested parties) can access, by queuing the recordings for export to physical media, and/or through a voice mail system. Calls may be selected for distribution based on the caller, the called party, conversation content, call time, or any other suitable criteria.

20 Claims, 2 Drawing Sheets

Related U.S. Application Data continuation of application No. 15/632,066, filed on Jun. 23, 2017, now Pat. No. 10,367,936, which is a continuation of application No. 13/923,046, filed on Jun. 20, 2013, now Pat. No. 9,692,889, which is a continuation of application No. 11/852,642, filed on Sep. 10, 2007, now Pat. No. 9,357,061.

(51) Int. Cl.
*H04L 51/08* (2022.01)
*H04L 67/02* (2022.01)
*H04L 67/06* (2022.01)
*H04M 3/533* (2006.01)

(52) U.S. Cl.
CPC .......... *H04L 67/06* (2013.01); *H04M 3/2281* (2013.01); *H04M 3/53366* (2013.01); *H04M 2203/301* (2013.01); *H04M 2203/303* (2013.01); *H04M 2203/558* (2013.01); *H04M 2203/6009* (2013.01)

(56) References Cited

U.S. PATENT DOCUMENTS

| | | | |
|---|---|---|---|
| 4,933,966 A | 6/1990 | Hird et al. | |
| 4,935,956 A | 6/1990 | Hellwarth et al. | |
| 5,319,702 A | 6/1994 | Kitchin et al. | |
| 5,371,842 A | 12/1994 | Easton et al. | |
| 5,469,370 A | 11/1995 | Ostrover et al. | |
| 5,539,812 A | 7/1996 | Kitchin et al. | |
| 5,570,417 A | 10/1996 | Byers | |
| 5,655,013 A | 8/1997 | Gainsboro | |
| 5,768,355 A | 6/1998 | Salibrici et al. | |
| 5,778,313 A | 7/1998 | Fougnies | |
| 5,854,975 A | 12/1998 | Fougnies et al. | |
| 5,883,945 A | 3/1999 | Richardson, Jr. et al. | |
| 5,923,746 A | 7/1999 | Baker et al. | |
| 5,926,533 A | 7/1999 | Gainsboro | |
| 5,991,376 A | 11/1999 | Hennessy et al. | |
| 6,002,427 A | 12/1999 | Kipust | |
| 6,016,343 A | 1/2000 | Hogan et al. | |
| 6,052,454 A | 4/2000 | Kek et al. | |
| 6,278,772 B1 * | 8/2001 | Bowater ........... H04M 3/42221 379/267 | |
| 6,570,970 B2 | 5/2003 | Gruchala et al. | |
| 6,636,591 B1 | 10/2003 | Swope et al. | |
| 6,639,977 B1 | 10/2003 | Swope et al. | |
| 6,647,096 B1 | 11/2003 | Milliorn et al. | |
| 6,668,045 B1 | 12/2003 | Mow | |
| 6,690,950 B2 | 2/2004 | Takagi et al. | |
| 6,728,345 B2 | 4/2004 | Glowny et al. | |
| 6,819,932 B2 | 11/2004 | Allison et al. | |
| 6,850,609 B1 | 2/2005 | Schrage | |
| 6,868,451 B1 * | 3/2005 | Peacock ............. H04L 67/06 719/315 | |
| 6,970,554 B1 | 11/2005 | Peterson et al. | |
| 7,005,993 B2 | 2/2006 | Webb et al. | |
| 7,046,779 B2 | 5/2006 | Hesse | |
| 7,076,031 B1 | 7/2006 | Bress et al. | |
| 7,079,636 B1 | 7/2006 | McNitt et al. | |
| 7,079,637 B1 | 7/2006 | McNitt et al. | |
| 7,106,843 B1 | 9/2006 | Gainsboro et al. | |
| 7,134,130 B1 | 11/2006 | Thomas | |
| 7,164,757 B2 | 1/2007 | Link | |
| 7,197,560 B2 | 3/2007 | Caslin et al. | |
| 7,256,816 B2 | 8/2007 | Profanchik et al. | |
| 7,333,798 B2 | 2/2008 | Hodge | |
| 7,496,345 B1 | 2/2009 | Rae et al. | |
| 7,505,406 B1 | 3/2009 | Spadaro et al. | |
| 7,529,357 B1 | 5/2009 | Rae et al. | |
| 7,551,732 B2 | 6/2009 | Anders | |
| 7,742,581 B2 | 6/2010 | Hodge et al. | |
| 7,742,582 B2 | 6/2010 | Harper | |
| 7,783,021 B2 | 8/2010 | Hodge | |
| 7,805,457 B1 | 9/2010 | Viola et al. | |
| 7,853,243 B2 | 12/2010 | Hodge | |
| 7,860,222 B1 * | 12/2010 | Sidler ................ H04L 63/302 379/85 | |
| 7,881,446 B1 | 2/2011 | Apple et al. | |
| 7,899,167 B1 | 3/2011 | Rae | |
| 7,961,860 B1 | 6/2011 | McFarlen | |
| 7,965,821 B2 | 6/2011 | Bouchard et al. | |
| 8,014,800 B2 | 9/2011 | Törnkvist | |
| 8,031,849 B1 * | 10/2011 | Apple .............. H04M 15/00 379/114.03 | |
| 8,098,804 B1 | 1/2012 | Rae et al. | |
| 8,121,264 B1 * | 2/2012 | Hogg, Jr .......... H04M 3/42221 379/88.19 | |
| 8,135,115 B1 | 3/2012 | Hogg, Jr. et al. | |
| 8,180,028 B1 | 5/2012 | Falcone et al. | |
| 8,204,177 B2 | 6/2012 | Harper | |
| 8,351,593 B2 | 1/2013 | Vick et al. | |
| 8,428,559 B2 | 4/2013 | Silva | |
| 8,458,732 B2 | 6/2013 | Hanna et al. | |
| 8,488,756 B2 | 7/2013 | Hodge et al. | |
| 8,509,390 B2 | 8/2013 | Harper | |
| 8,577,003 B2 | 11/2013 | Rae | |
| 8,583,527 B2 | 11/2013 | Polozola et al. | |
| 8,626,118 B2 | 1/2014 | Smith et al. | |
| 8,644,466 B1 | 2/2014 | Dawson | |
| 8,855,280 B1 | 10/2014 | Passe et al. | |
| 8,976,949 B2 | 3/2015 | Torgersrud et al. | |
| 9,043,813 B2 | 5/2015 | Hanna et al. | |
| 9,077,680 B2 | 7/2015 | Harper | |
| 9,124,763 B2 | 9/2015 | Humphries | |
| 9,210,175 B2 | 12/2015 | Gupta | |
| 9,614,974 B1 | 4/2017 | Hodge et al. | |
| 9,692,889 B2 * | 6/2017 | Rokosky ............ H04L 51/08 | |
| 10,367,936 B2 | 7/2019 | Rokosky et al. | |
| 11,140,262 B2 | 10/2021 | Rokosky et al. | |
| 2002/0067810 A1 | 6/2002 | Barak et al. | |
| 2002/0073207 A1 | 6/2002 | Sidler et al. | |
| 2002/0095296 A1 | 7/2002 | Hind et al. | |
| 2002/0095415 A1 | 7/2002 | Walker et al. | |
| 2002/0099776 A1 * | 7/2002 | Cafarella ........... H04L 69/329 709/206 | |
| 2002/0118798 A1 * | 8/2002 | Langhart .......... H04M 3/42221 379/67.1 | |
| 2002/0183040 A1 | 12/2002 | Lundstrom et al. | |
| 2002/0194096 A1 | 12/2002 | Falcone et al. | |
| 2003/0002639 A1 | 1/2003 | Huie | |
| 2003/0046083 A1 | 3/2003 | Devinney, Jr. et al. | |
| 2003/0086546 A1 | 5/2003 | Falcone et al. | |
| 2004/0058667 A1 | 3/2004 | Pienmaki et al. | |
| 2005/0094794 A1 | 5/2005 | Creamer et al. | |
| 2005/0102371 A1 | 5/2005 | Aksu | |
| 2005/0141678 A1 | 6/2005 | Anders et al. | |
| 2005/0207357 A1 | 9/2005 | Koga | |
| 2005/0259809 A1 | 11/2005 | Hodge | |
| 2006/0098796 A1 | 5/2006 | Link | |
| 2006/0149644 A1 | 7/2006 | Salmar et al. | |
| 2006/0285650 A1 | 12/2006 | Hodge | |
| 2006/0294043 A1 | 12/2006 | Taisdeal | |
| 2007/0016613 A1 * | 1/2007 | Foresti ............... G06Q 10/107 | |
| 2007/0071206 A1 | 3/2007 | Gainsboro et al. | |
| 2007/0133437 A1 | 6/2007 | Wengrovitz et al. | |
| 2007/0155411 A1 | 7/2007 | Morrison | |
| 2008/0012760 A1 | 1/2008 | Derrick et al. | |
| 2008/0023543 A1 | 1/2008 | Beisang | |
| 2009/0067587 A1 | 3/2009 | Rokosky et al. | |
| 2009/0254392 A1 | 10/2009 | Zander | |
| 2010/0299761 A1 | 11/2010 | Shapiro | |
| 2011/0247045 A1 | 10/2011 | Rajagopal et al. | |
| 2013/0179949 A1 | 7/2013 | Shapiro | |
| 2013/0279668 A1 | 10/2013 | Rokosky et al. | |
| 2013/0279686 A1 | 10/2013 | Keiser et al. | |
| 2013/0304581 A1 | 11/2013 | Soroca et al. | |
| 2013/0340028 A1 | 12/2013 | Rajagopal et al. | |
| 2014/0033230 A1 | 1/2014 | Hanna et al. | |
| 2015/0188925 A1 | 7/2015 | Gupta | |
| 2015/0358457 A1 | 12/2015 | Hodge | |
| 2016/0028786 A1 | 1/2016 | Hanna et al. | |
| 2016/0103996 A1 | 4/2016 | Salajegheh et al. | |

(56) References Cited

U.S. PATENT DOCUMENTS

| | | |
|---|---|---|
| 2016/0165393 A1 | 6/2016 | Pang |
| 2016/0191484 A1 | 6/2016 | Gongaware |
| 2016/0210607 A1 | 7/2016 | Griffin |
| 2016/0248766 A1 | 8/2016 | Tembey et al. |
| 2016/0309122 A1 | 10/2016 | Kingery |
| 2017/0295279 A1 | 10/2017 | Rokosky et al. |
| 2020/0028964 A1 | 1/2020 | Rokosky et al. |

OTHER PUBLICATIONS

"Cisco IAD2400 Series Business-Class Integrated Access Device", Cisco Systems Datasheet, 2003.
"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html.
"PacketCable™ Audio/Video Codecs Specification," Cable Television Laboratories, Inc., Ser. No. PKT-SP-CODEC-I05-040113 (2004).
"SIP and IPLinkTM in the Next Generation Network: An Overview," Intel, 2001.
"The AutoEDMS Document Management and Workflow System: An Overview of Key Features, Functions and Capabilities," ACS Software, May 2003.
"Voice Over Packet in Next Generation Networks: An Architectural Framework," Bellcore, Special Report SR-4717, Issue 1, Jan. 1999.
"Criminal Calls: A Review of the Bureau of Prisons' Management of Inmate Telephone Privileges," U.S. Department of Justice, Office of the Inspector General, Aug. 1999.
"Why Can't You Make a Collect Call to a Cell Phone," National Public Radio, Jun. 30, 2008, Accessed via http://www.npr.org/templates/story/story.php?storyId=92021561 on Apr. 6, 2015.
1800MumDad.com.au—Explanation, Aug. 29, 2007—Retrieved from the Internet Archive Wayback Machine at https://web.archive.org/web/20070829114354/http://1800mumdad.com.au/main.php?type=charges2; 2 pages.
1800MumDad.com.au—Summary Standard Form of Agreement, Apr. 26, 2006—Retrieved from the Internet Archive Wayback Machine at https://web.archive.org/web/20060426180115/http://www.1800mumdad.com.au/main.php?type=summarysfoa; 3 pages.
Ahimovic et al., "Services for Tomorrow's PCS," IEEE International Conference on Universal Personal Communications, vol. 1, Oct. 12-15, 1993; pp. 222-227.
Appendices A-G of U.S. Appl. No. 60/377,763, filed May 3, 2002.
Assignment of U.S. Pat. No. 8,190,121 and U.S. Appl. No. 13/449,308.
Brown, et al., "SMS: The Short Message Service," Computer, vol. 40, No. 12, 2007.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Clifford J. Weinstein, MIT, The Experimental Integrated Switched Network—A System-Level Network Test Facility (IEEE 1983).
Commander Call Control System, Rev. 1.04 (Science Dynamics 2002).
Confalone et al., "Calling Card Service—TSPS Hardware, Software, and Signaling Implementation," The Bell System Technical Journal, Sep. 1982, vol. 61, No. 7; pp. 1675-1714.
Definition of "telephony", McGraw-Hill Dictionary of Scientific and Technical Terms, 6th Edition (McGraw-Hill, 2003).
Definitions of "Local Area Network (LAN)" and "Wide Area Network (WAN)," Microsoft Computer Dictionary (Microsoft Press 2002), pp. 304 and 561.
Excerpts from the Prosecution History of U.S. Appl. No. 10/135,878, filed Apr. 29, 2002.
File History of U.S. Pat. No. 6,636,591, U.S. Appl. No. 09/640,999, filed Aug. 17, 2000.
File History of U.S. Pat. No. 8,135,115, U.S. Appl. No. 11/603,938, filed Nov. 22, 2006.
File History of U.S. Pat. No. 8,190,121, U.A. Appl. No. 12/103,138, filed Apr. 15, 2008.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
Reexamination U.S. Appl. No. 90/012,802 of U.S. Pat. No. 8,190,121, filed Mar. 1, 2013.
Fleischman, E.,"Advanced Streaming Format (ASF) Specification," Microsoft Corporation (Jan. 9, 1998).
Garner, et al., "Mobile Terminated SMS Billing—Exploits and Security Analysis," IEEE International Conference on Information Technology: New Generations, 2006.
Jain, A., "An Introduction to Biometric Recognition," IEEE Transactions on Circuits and Systems for Video Technology, vol. 14, No. 1, Jan. 2004; pp. 4-20.
Jeff Hewett and Lee Dryburgh, Signaling System No. 7 (SS7/C7): Protocol, Architecture, and Services (Networking Technology) at 85 (Cisco Press, Jun. 2005).
Johnson, S., "An Environment for Treating Youthful Offenders," the Robert F. Kennedy Youth Center, Offender Rehabilitation, vol. 2, No. 2, 1977; pp. 159-172.
Joint Application, filed in in re ASP GTEL Holdco, LLC, No. 11-184 (Fed. Commc'ns Comm'n Oct. 28, 2011).
Joint Claim Construction and Prehearing Statement, Exhibit B: Securus' Intrinsic and Extrinsic Evidence Charts, *Global Tel*Link Corporation* v. *Securus Technologies, Inc.*, No. 3:14-cv-00829-K (N.D. Tex.), Sep. 26, 2014.
Kandel et al., "Rapid Educational Rehabilitation for Prison Inmates," Behaviour Research & Therapy, vol. 14, 1976; pp. 323-331.
Karacki et al., "Rewards in an Institution for Youthful Offenders," The Howard Journal of Penology and Crime Prevention, vol. XIII, No. 1, 1970; pp. 20-30.
Kozamernik, F., "Media Streaming over the Internet—an overview of delivery technologies," EBU Technical Review (Oct. 2002).
Liebling, "Incentives and Earned Privileges Revisited: Fairness, Discretion, and the Quality of Prison Life," Journal of Scandanavian Studies in Criminology and Crime Prevention, vol. 9, 2008; pp. 25-41.
McKitterick et al., "State of the Art Review of Mobile Payment Technology," Department of Computer Science, Trinity College Dublin, 2003; 22 pages.
Microsoft Computer Dictionary, Fifth Edition, Microsoft Computer Press: Redmond, WA, 2002.
Newton, H., Newton's Telecom Dictionary (18th ed. 2002); p. 655.
Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Prosecution History of U.S. Appl. No. 11/005,816, filed Dec. 7, 2004.
Prosecution History of U.S. Appl. No. 11/045,589, filed Dec. 12, 2006.
Prosecution History of U.S. Appl. No. 11/562,842, filed Nov. 22, 2006.
Response to Office Action, filed Jan. 6, 2009, in Prosecution History of U.S. Pat. No. 10/642,532, filed Aug. 15, 2003.
Rey, R.F., ed., "Engineering and Operations in the Bell System," 2nd Edition, AT&T Bell Laboratories: Murray Hill, NJ, 1983.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).

(56) References Cited

OTHER PUBLICATIONS

Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Segal, D., "Phoning From Prison, at Prices Through the Roof," The New York Times, Feb. 1, 2014.
Shields, T., "Prison Phones Prove Captive Market for Private Equity," Bloomberg Business, Oct. 4, 2012.
Sundstrom, K., "Voice over IP: an Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 60/377,763, filed May 3, 2002.
U.S. Appl. No. 60/607,447, "IP-based telephony system and method," to Apple, et al., filed Sep. 3, 2004.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.
Valcourt, et al., "Investigating mobile payment: Supporting technologies, methods, and use," IEEE International Conference on Wireless and Mobile Computing, Networking, and Communications, 2005.
Walden, R., "Performance Trends for Analog-to-Digital Converters," IEEE Communications Magazine, Feb. 1999.
Waldon et al., The Industry Analysis Division's Reference Book of Rates, Price Indices, and Household Expenditures for Telephone Service, Mar. 1997; 167 pages.
Wireless Interconnection and Reciprocal Compensation Agreement Between Community Telephone Company and United States Cellular Corporation, Apr. 24, 2006; 29 pages.
Wormith, J.S., "The Development of a Prison Incentive System: A Case Illustration," Proceedings of the First Annual Corrections Research Forum, Ottawa Mar. 1989; pp. 77-93.
International Search Report and Written Opinion directed to related International Patent Application No. PCT/US17/64932, dated Jan. 5, 2018; 11 pages.
Definitions of "circuit switching" and "packet switching", Newton's Telecom Dictionary, 10th Edition, 1996; p. 253.
International Search Report and Written Opinion directed to related International Patent Application No. PCT/US17/59325, dated Jan. 26, 2018; 13 pages.
Final Office Action directed to U.S. Appl. No. 11/852,642, dated Nov. 18, 2015; 12 pages.
Final Office Action directed to U.S. Appl. No. 13/923,046, dated Feb. 16, 2016; 10 pages.
Final Office Action for U.S. Appl. No. 11/852,642, dated Apr. 24, 2013; 10 pages.
Final Office Action for U.S. Appl. No. 13/923,046, dated Sep. 24, 2014; 10 pages.
Non-Final Office Action for U.S. Appl. No. 11/852,642, dated Aug. 12, 2014; 12 pages.
Non-Final Office Action for U.S. Appl. No. 11/852,642, dated Aug. 12, 2015; 12 pages.
Non-Final Office Action for U.S. Appl. No. 11/852,642, dated Jun. 21, 2012; 10 pages.
Non-Final Office Action for U.S. Appl. No. 13/923,046, dated Dec. 18, 2013; 13 pages.
Non-Final Office Action for U.S. Appl. No. 13/923,046, dated Jul. 6, 2015; 9 pages.
Non-Final Office Action for U.S. Appl. No. 13/923,046, dated Sep. 22, 2016; 9 pages.
Notice of Allowance directed to U.S. Appl. No. 11/852,642, dated Mar. 23, 2016; 7 pages.
Notice of Allowance for U.S. Appl. No. 11/852,642, dated Mar. 17, 2015; 7 pages.
Notice of Allowance for U.S. Appl. No. 11/852,642, dated Oct. 15, 2013; 10 pages.
Notice of Allowance for U.S. Appl. No. 13/923,046, dated May 17, 2017; 7 pages.

* cited by examiner

AUTOMATIC DISTRIBUTION OF INMATE PHONE RECORDINGS

CROSS-REFERENCE TO RELATED APPLICATIONS

This application is a continuation of U.S. application Ser. No. 16/525,159, filed Jul. 29, 2019, entitled Automatic Distribution of Inmate Phone Recordings, which is a continuation of U.S. application Ser. No. 15/632,066, filed Jun. 23, 2017, entitled Automatic Distribution of Inmate Phone Recordings (now U.S. Pat. No. 10,367,936), which is a continuation of U.S. application Ser. No. 13/923,046, filed Jun. 20, 2013, entitled System and Method for the Automatic Distribution of Inmate Phone Recordings (now U.S. Pat. No. 9,692,889), which is a continuation of U.S. application Ser. No. 11/852,642, filed on Sep. 10, 2007, entitled System and Method for the Automatic Distribution of Inmate Phone Recordings (now U.S. Pat. No. 9,357,061), all of which are incorporated herein by reference in their entireties.

BACKGROUND OF THE INVENTION

Field of the Invention

The instant invention relates generally to telecommunication services that are provided through an institutional phone system, such as the phone system in a correctional institution. In particular, the instant invention relates to a system and method for delivering recordings of telephone conversations, such as inmate telephone conversations, to interested individuals, such as police and district attorney investigators.

Background Art

In the correctional industry, inmate phone calls are often controlled through sophisticated call processing equipment. The call processing equipment controls various aspects of the use of the telephone in order to meet a variety of competing concerns including security, accessibility, and revenue generation. One objective of an inmate telephone system is to maximize the security of the system and to also maximize the revenue produced by the system while providing the inmate with accessibility to reasonable telecommunication services as authorized by the institution.

One feature that inmate phone systems may provide is the ability to maintain lists of allowed or blocked phone numbers by inmate, by class of inmate, or globally for a facility. Such lists allow the institution to regulate who an inmate can and cannot call. As an example of a list applied to a specific inmate, an inmate may be allowed to call his wife, but may not be allowed to call a co-defendant. As an example of a global list, all inmates may be allowed to call the local public defender's office, but may be disallowed from calling local judges. This feature balances the concern for security (e.g., disallowing calls to victims, witnesses and judges) with the concern of allowing an inmate with accessibility for legally mandated purposes (e.g., calls to the public defender) or personal reasons (e.g., calls to family members).

Another feature that an inmate telephone system may provide is the ability to monitor and record calls. This feature addresses the security concerns of the facility by allowing internal investigators to monitor what is occurring inside the institution and among the inmate population. This feature addresses the security concerns of society generally by allowing external investigators access to phone conversations that relate to the investigation of activities external to the institution.

Another feature that an inmate telephone system may provide is the recording and retrieval of call detail information (e.g., the identity of the caller, the called party, the time of the call, and the like). This feature is important to addressing the concerns of security and revenue. Call detail records allow investigators to research data such as the inmate that placed the call, the phone number that was dialed, what time the call was placed, and how long the conversation lasted. This research can often be performed by call, by inmate, by called number, by time of call and by any combination thereof. Investigators can analyze this data to determine patterns and connections between people and places that are relevant to internal and external investigations. Call detail records are also the fundamental data required for billing calls and managing revenue.

Another feature that an inmate telephone system may provide is the ability to alert and/or notify an investigator of a call of interest. This feature allows an investigator to be notified when a specific inmate makes a phone call, when a specific phone number is dialed, or a combination thereof. This feature addresses the both internal and external security needs by immediately alerting an investigator when a person or pattern of interest is identified and allowing the investigator to immediately monitor the call, review the call details, review the call recording, or any combination thereof, for example to gather intelligence.

A function of substantially all inmate phone systems is to enable the billing of phone calls. Inmate telephone systems provide different methods for inmates to place and pay for calls. For example, call payment options may include collect calling (wherein the called party pays for the call), debit calling (wherein the inmate pays for the call with funds from their commissary account), pre-paid calling cards, and pre-paid accounts associated with a called number.

Another feature that an inmate telephone system may provide is the ability to allow free calls. Free calls may be allowed by phone (e.g., a particular device dedicated to free calls), by dialed phone number, by inmate, or by phone location. Typically, an individual is permitted to make one or more free calls upon arrest and/or incarceration. Free calls are permitted to allow the arrestee to call an attorney, to contact a bail bondsman, to notify an associate or family member that they are incarcerated, or any combination thereof. The free call feature addresses the concern of allowing inmates reasonable access to inmate calling services for legal and personal reasons.

Implementation of many of the features discussed above relies upon the ability to identify the inmate using the phone. In order to implement features specific to the inmate using the phone, the phone system must provide some way to authenticate and/or identify the user. This can be done, for example, through the use of a Telephone ID (TID), a biometric, or other authentication technique.

While the inmate phone systems and features described above address, to a certain extent, the balance between security, accessibility, and revenue, some of the features described above are not fully utilized. This may be due to the staffing overhead required to effectively implement the feature. That is, in some cases, utilization of a particular feature may create an additional burden on a correctional staff that is already operating within tight budgetary constraints.

BRIEF SUMMARY OF THE INVENTION

Two features of inmate telephone systems that are often not fully utilized are the capability to record calls and make the calls available for export and the related capability to automatically notify an investigator when a call of interest is placed. In one typical scenario, when an investigator is notified that a call of interest has been made, the investigator must contact the correctional institution and request that the correctional staff locate, export, and ship the call(s) of interest to the investigator. Another typical scenario is for an investigator to request export of all calls for a particular inmate, all calls to a specific number, all calls by a particular inmate to a particular target phone number, all calls from a specific date range, some combination thereof, or the like.

Another shortcoming of many existing inmate telephone systems relates to the capability that notifies an investigator of a call of interest and permits the investigator to listen in to the call in progress. To be able to listen in to the call in progress, the investigator must be available at the time the call is talking place. In the event the investigator misses the call, some inmate phone systems provide the investigator with an alert that the call has occurred, for example by sending the investigator a message via e-mail or another messaging system. Upon receiving such notification, the investigator must go through the process of accessing the inmate phone and/or recording system, locating the call, and listening to it. Often, the investigator cannot perform these steps himself, and must instead request that the correctional facility find and export the call to the investigator for review, which shifts the burden of locating and shipping recordings to the correctional facility's staff.

Many inmate telephone systems require a series of manual steps to be carried out to locate and export call recordings requested by external investigators. This process can take several minutes to several hours, depending on the number of calls exported, the storage media where the source recordings exist, the type of media that the calls are being exported to, and the connectivity that exists between the source and target recording devices. These additional steps increase the time before the investigator receives, and therefore can respond to, actionable intelligence.

Requiring correctional staff to locate and export call recordings also affects security within the correctional institution. Many correctional facilities today are facing a constrained budget yet record high prison populations, requiring them to make efficient use of limited staff resources. While addressing requests from external investigators benefits investigations that enhance to the safety and security of society at large, doing so can divert correctional staff from maintaining the inmate population and the physical security of the correctional environment.

Accordingly, it is desirable to improve the accessibility of inmate telephone calls to investigators and others monitoring those calls.

Disclosed herein is a method of automatically distributing a recording of a phone call to at least one interested party, the phone call being placed by a calling party through an institutional phone system to a destination number. The method includes the steps of: associating one or more forwarding criteria with each of one or more interested parties; establishing the phone call from the calling party to the destination number through the institutional phone system; recording the phone call; and if the phone call satisfies one or more forwarding criteria associated with one or more interested parties, automatically distributing the recording of the phone call to the at least one interested party associated with the satisfied one or more forwarding criteria.

In some embodiments of the invention, the step of associating one or more forwarding criteria with each of one or more interested parties includes associating at least one calling party identity with at least one interested party. The step of associating one or more forwarding criteria with each of one or more interested parties may also include associating at least one destination number with at least one interested party, associating at least one time of call with at least one interested party, and/or associating at least one conversation content item with at least one interested party.

Optionally, the step of associating one or more forwarding criteria with each of one or more interested parties includes associating two or more of the following with at least one interested party: calling party identity forwarding criteria, destination number forwarding criteria, time of call forwarding criteria, conversation content forwarding criteria, and combinations thereof.

In some embodiments of the invention, the step of associating one or more forwarding criteria with each of one or more interested parties includes: establishing a plurality of data records, each data record including at least contact information for an interested party and one forwarding criterion; and storing the plurality of data records in a recipients database. Each data record may further include one or more delivery criteria for the interested party.

It is contemplated that the step of automatically distributing may include: setting a data flag when the recording of the phone call is complete; and if the phone call satisfies one or more forwarding criteria associated with one or more interested parties, distributing the recording of the phone call in response to the data flag to the at least one interested party associated with the satisfied one or more forwarding criteria.

The step of distributing the recording of the phone call to the at least one interested party associated with the satisfied one or more forwarding criteria may include e-mailing a copy of the recorded phone call to the at least one interested party, exporting the recording of the phone call to one or more physical media and providing the at least one interested party with access to the one or more physical media, uploading the recording of the phone call to a website, and/or providing access to the call via a hosted voicemail system. In embodiments of the invention where the recording of the phone call is exported to one or more physical media, it is contemplated that this may include: placing the recording of the phone call in an export queue; and exporting the recording of the phone call to one or more physical media from the export queue on a scheduled basis.

Optionally, the method further includes: establishing a second phone call from a calling party to a second destination number through the institutional phone system; recording the second phone call; determining that the second phone call does not satisfy any forwarding criteria associated with one or more interested parties; and storing the recorded second phone call into memory without automatically forwarding it.

In certain embodiments of the invention, the method also includes enclosing the recording of the phone call in a security wrapper prior to distributing the recording of the phone call to the at least one interested party. The security wrapper may provide authentication of the recording (e.g., for use as evidence in court), encryption of the recording, or both authentication and encryption.

The present invention also provides a method of automatically distributing a phone call recording to one or more interested parties, which generally includes the steps of: storing a plurality of recipient records in a recipients database, each recipient record including identity information for at least one recipient, forwarding criterion to specify the conditions for determining which recordings will be forwarded, and at least one delivery criterion to specify the delivery medium for forwarding recordings; establishing a phone call; recording the phone call; identifying one or more recipient records whose forwarding criterion are met by information associated with the phone call; and distributing the recording of the phone call to the at least one recipient included therein according to the at least one delivery criterion associated with the at least one recipient.

The step of distributing the recording may include: setting a status flag to indicate that a recording of a phone call is available for forwarding; and automatically distributing the recording of the phone call to the at least one recipient in response to a change in status of the status flag, whereby the distribution is accomplished using the at least one delivery criterion associated with the at least one recipient. Optionally, the step of distributing the recording may include: encrypting the recording of the phone call using an encryption key to create an encrypted recording; and wherein the distribution step is carried out by distributing the encrypted recording. The encryption key may be, for example, a public key associated with a private/public key system.

In another aspect of the present invention, a system for automatically distributing a phone call recording to one or more interested parties generally includes: at least one telephone device; a recipients database, the recipients database including a plurality of recipient records, each recipient record including identity information for at least one recipient, forwarding criterion to specify the conditions for determining which recordings will be forwarded, and at least one delivery criterion to specify the delivery medium for forwarding recordings; and a call recording distribution processor that identifies one or more recipient records whose forwarding criterion are met by information associated with the phone call and distributes the recording of the phone call to the at least one recipient identified therein using the medium associated with the at least one delivery criterion. The system may also include at least one forwarding agent, such as an e-mail agent, a web service agent, an export queuing agent, a voicemail agent, or a combination thereof, wherein the call recording distribution processor invokes the at least one forwarding agent to distribute the recording of the phone call to the at least one recipient. Typically, the system will also include at least one call recording archive in which is stored a plurality of phone call recordings.

The present invention advantageously provides functionality beyond the functionality provided by many inmate phone providers. The invention disclosed herein provides a method to automatically distribute an inmate phone call recording upon the completion of the call to one or more interested parties that have been approved by the facility administration. The present invention thereby addresses the shortcomings of existing inmate phone systems, leading to increased security and efficiency. Moreover, the present invention advantageously improves outside investigator access to recorded calls without adversely impacting the quality, security, or performance of the inmate telecommunications services.

The foregoing and other aspects, features, details, utilities, and advantages of the present invention will be apparent from reading the following description and claims, and from reviewing the accompanying drawings.

DETAILED DESCRIPTION OF THE INVENTION

The present invention provides a method and system for distributing recorded calls of interest to one or more parties. Typically, these calls will take place at least in part using an institutional telephone system. The term "institutional telephone system" (or "institutional phone system") as used herein refers to a telephone system installed in an environment wherein it is desirable to control or regulate telephone usage, including, without limitation, correctional facilities, military installations, hospitals, schools, business offices, and government offices. Though the invention will be described in connection with the corrections industry, and in particular in connection with an inmate telephone system that distributes recorded calls to investigators, it should be understood that the invention is not so limited. One of ordinary skill in the art will appreciate that the principles disclosed herein may be employed to good advantage in any telephone system where it is desirable to monitor telephone calls (e.g., telephonic sales calls and technical support calls).

The call recording distribution system according to the present invention may be implemented as an enhancement to an inmate telephone system, such as the ITI Offender Communication System. Of course, the call recording distribution system disclosed herein may also be implemented in connection with other inmate telephone systems, including, but not limited to, Global Tel*Link's LazerPhone system, Securus Technologies' Secure Call Platform, Pay-Tel Communications, Inc.'s inmate telephone system, and PCS Corporation's Inmate Communications Systems. One of ordinary skill in the art will generally appreciate the functions and capabilities of an inmate telephone system. Thus, inmate telephone systems, such as those listed above, are described herein only to the extent necessary to understand the present invention.

Figure 1:
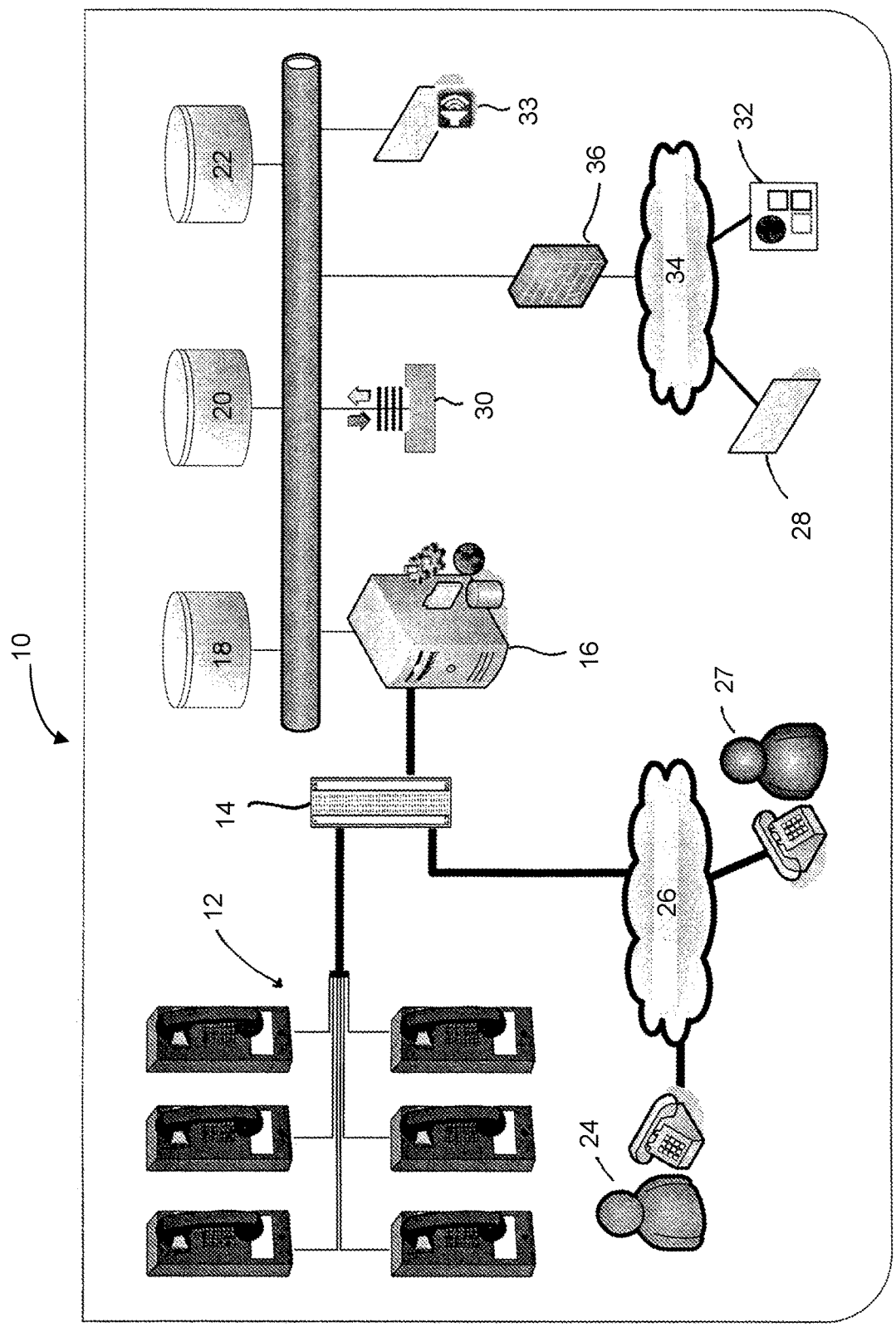
FIG. 1 is an overview of an inmate telephone system including recorded call distribution functionality according to an embodiment of the present invention.

FIG. 1 is a schematic illustration of a call recording distribution system 10, for example an inmate telephone system including call recording distribution functionality. The call recording distribution system 10 generally includes one or more telephone devices 12 (referred to herein as "inmate phones"), which are coupled to one or more phone system servers 16, for example through connection block 14. One of ordinary skill in the art will appreciate that telephone devices 12 may be coupled to phone system servers 16 through other means, such as through hard-wiring or digitally through VOIP technology, without departing from the spirit and scope of the present invention. Only one phone system server 16 is illustrated in FIG. 1 for the sake of clarity.

The phone system server 16 is coupled to one or more databases, such as a call recording archive 18 (which stores recordings of calls made using telephone devices 12), a configuration database 20, and a recipients database 22. The term "database" as used herein includes, but is not limited to, relational databases in which a plurality of data sets are associated with each other and stored, preferably as one or more records. The database may be stored in a single medium or may be stored in multiple media interconnected by a network. The term "database" also includes any collection of related data organized and stored in an electronic format (e.g., a delimited ASCII file).

A caller using one of the inmate telephones 12 may be connected to a called party 24 through network 26, which may be the PSTN, a cellular network, VOIP, or any other telephony network technology. One of ordinary skill in the art will appreciate that an investigator 27 may also connect through network 26, for example to monitor a call in progress between called party 24 and a caller using one of the inmate telephones 12.

The call recording distribution system 10 also generally includes one or more forwarding agents to transport the call recordings to each of the designated recipients. The term "forwarding agent" is used herein to refer to any technology that is capable of electronically addressing and delivering a call recording file to a specified address or recipient without the involvement or intervention of a natural person. Preferably the agent is a computer program. Preferably, the call recording distribution system 10 includes one or more of the following types of forwarding agents: email agents 28, export queuing agents 30, web service agents 32, and voice mail agents 33.

An email agent 28 is a forwarding agent that is capable of sending a call recording as an email attachment to any valid email address. The call recording file can be attached to an email in any format, including, without limitation, Waveform Audio (WAV), Windows Media Audio (WMA), MPEG Audio, or any other standard media format. A call recording file that is attached to an email may optionally be compressed using a compression technology such as ".zip" in order to reduce the size of the attachment.

An export queuing agent 30 queues call recordings for later export to CD, DVD, or other media. In some embodiments of the invention, the export agent 30 automatically exports queued call recordings to a media burner, such as the Primera Bravo Series Disc Publisher, on a scheduled basis. It is also contemplated that recordings may be exported on an on-demand basis. By using a media burner, such as the Primera Bravo XR, the export queuing agent 30 can automatically create and label a CD, DVD, Blu-ray Disc, or other media of call recordings for each investigator or recipient that has calls of interest placed during a scheduled period. Once the automatic disc publisher has created the media, the media can be distributed to the investigator or other recipient, for example by a corrections officer the next time the investigator visits the correctional facility or via mail or courier service. The export queuing agent 30 may reside either on the inmate phone system itself (as shown in FIG. 1) or at some other location on the local network (not shown).

A web service agent 32 distributes a call recording by invoking a web service handler on a remote system in order to upload the call recording to a website. The web service handler supports forwarding call recordings to third party systems or centralized call recording repositories. A web service handler may optionally compress the call recording using a technology such as ".zip" in order to reduce the size of the recording for transport across a network. Interested parties can then retrieve the call recording from the website; it is contemplated that access to the website may be protected by a username/password combination or other authentication routine such that only authorized users can access call recordings. Moreover, use of an authentication routine can enhance convenience by presenting an authenticated interested party only with those call recordings uploaded for that particular interested party.

A voice mail agent 33 makes call recordings available through a voice mail service, such as a dial-up voice mail service. For example, an investigator (e.g., investigator 27) may dial a phone number associated with the voice mail agent and voice mail service and enter a unique personal identification number (PIN) to access the voice mail system (e.g., through network 26). Recordings that have been identified for distribution to the investigator may then be provided as messages in the voice mail system. Upon accessing the voice mail system, the voice mail agent 33 may notify the investigator of new messages (e.g., new call recordings), and may prompt the investigator to play the messages back. The investigator may use the telephone keypad to enter commands, such as play, stop, skip, rewind, fast forward, save, delete, and the like, into the voice mail system. The investigator may be able to forward a call recording to another user, for example by entering another user's ID. In addition to forwarding the call recording as a voice mail, it is contemplated that the call recording may be forwarded according to the other user's preferences as contained in the recipients database, described below.

The email and web service agents 28, 32 can transport call recordings over data network 34, such as an IP based local area network (LAN), wide area network (WAN), or the Internet. A firewall 36 may be provided for security of the call recording distribution system 10.

The call recording distribution system 10 utilizes a set of configuration items to control behavior of the system. For example, configuration items may address email server setup, call recording format, export media size and location, frequency of automated export jobs, and web service destination URLs. Thus, configuration items facilitate adapting the call recording distribution system 10 to the various operational rules of the facility in which the system is installed.

Preferably, configuration items are stored in configuration database 20. One of ordinary skill in the art will appreciate, however, that configuration items may be stored in a variety of other ways, such as in a properties file or an initialization file, without departing from the spirit and scope of the invention.

The call recording distribution system 10 also typically contains a database 22 of recipients that are eligible to receive distributed call recordings, for example via the email agent 28 or by distribution of physical media created through the export queuing agent 30. These recipients of distributed call recordings may also be referred to as "interested parties." The recipients database 22 preferably contains contact and routing information for each recipient, such as an email address to which call recordings are to be sent. Information that may be stored within recipients database 22 (e.g., as data records, sometimes referred to herein as "recipient records") includes, without limitation, recipient names, recipient organizations, recipient contact phone numbers, and recipient addresses. It is also contemplated that a single recipient record may include information for multiple recipients (e.g., two investigators participating in the same investigation).

The recipients database 22 may also contain the inmates, destination phone numbers, and inmate/destination phone number combinations of which the recipient is interested in receiving call recordings (referred to herein as "forwarding criteria"). Other forwarding criteria, including, but not limited to, call times, call durations, and conversation content (e.g., words and/or phrases uttered during the call, topics discussed during the call, patterns observed during the call and the like) may also be utilized. Audio mining of a monitored telephone conversation for conversation content is further described in U.S. provisional application No. 60/901,342, filed Feb. 15, 2007, which is hereby incorporated by reference as though fully set forth herein. In addition, it is also contemplated that a forwarding criterion may be associated with the preferred method by which a call recording satisfying the forwarding criterion is distributed (e.g., via email, via export queue, via web service, or some combination thereof) (referred to herein as "delivery criteria"). Alternatively, delivery criteria may be associated with the recipient (e.g., all call recordings distributed to this interested party are distributed via email).

Thus, a recipient record may include contact information and the like for one or more recipients, one or more forwarding criteria, and one or more delivery criteria.

Phone system sever 16 includes a call recording distribution processor. The term "processor" as used herein refers to a computer microprocessor and/or a software program (e.g., a software module or separate program) that is designed to be executed by one or more microprocessors running on one or more computer systems. The call recording distribution processor distributes call recordings to interested parties in accordance with the present invention.

Figure 2:
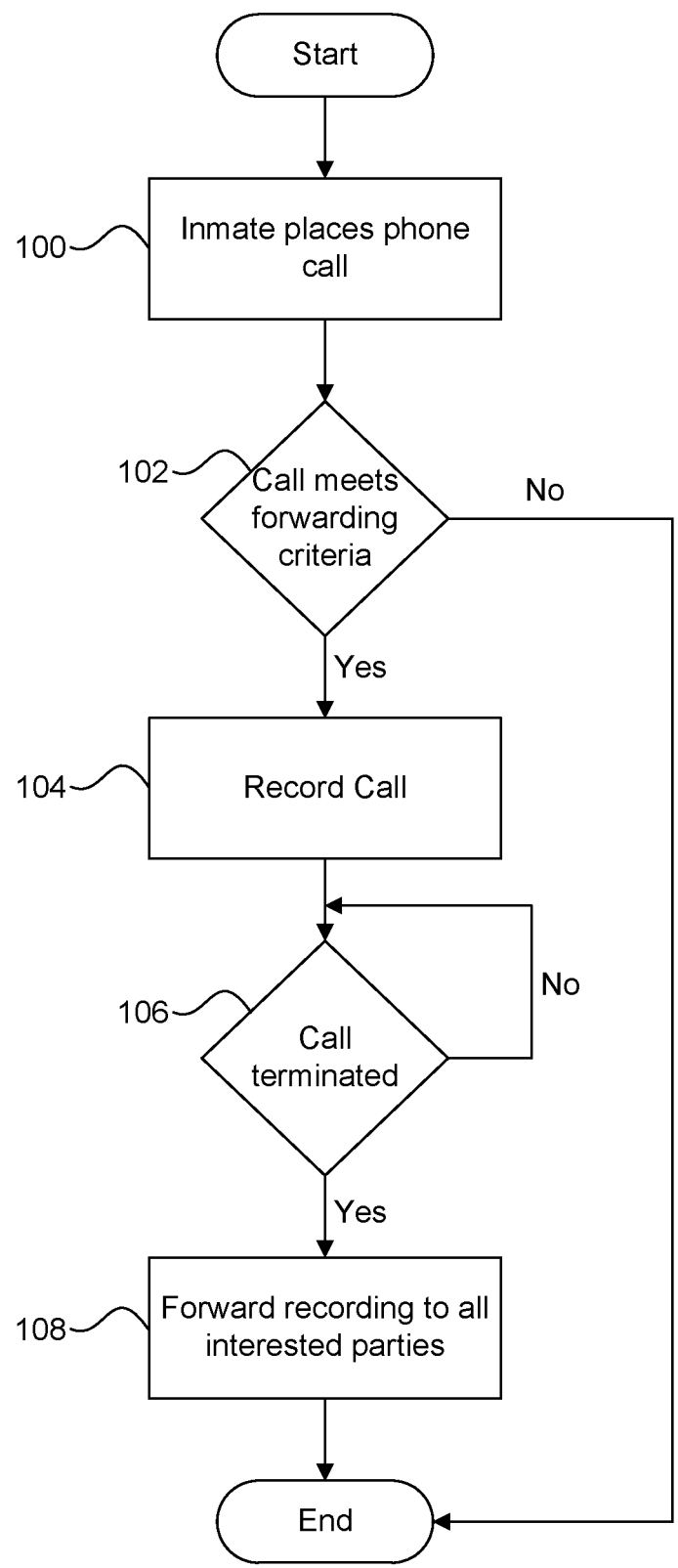
FIG. 2 is a flowchart that illustrates one method of call recording distribution according to the present invention.

One method of distributing call recordings will be described in connection with the flowchart of FIG. 2. In step 100, an inmate initiates a phone call from one of the inmate phones 12 connected to the inmate phone system. Before placing a call, inmates are typically required to enter an input that identifies the inmate to the inmate telephone system (e.g., a telephone ID number ("TID"), a biometric, or a combination thereof). The inmate also will enter a destination phone number. Provided the inmate can be authenticated to the inmate phone system and is permitted to make a call to the destination number (e.g., the inmate has a sufficient commissary account balance and the call does not violate any rules of the correctional facility), the inmate telephone system will route the call through the telephony network 26 to the called party 24.

In decision block 102, which may occur when the call is answered by the called party 24 and connected, the call recording distribution processor examines the call to determine if it satisfies one or more forwarding criteria. As described above, these forwarding criteria may be associated with entries in the recipients database 22. For example, based upon forwarding criteria, the system 10 may determine that all calls from this particular inmate should be distributed to one or more interested parties. Alternatively, the system 10 may determine that all calls to the dialed destination number should be distributed to one or more interested parties. As still another alternative, the system 10 may determine that all calls from this particular inmate to the dialed destination number should be distributed to one or more interested parties. If the call does not meet any forwarding criteria, the "NO" exit is taken from decision block 102 and the process ends.

If, however, the call does meet one or more forwarding criteria, the "YES" exit is taken from decision block 102 and the call is recorded in step 104. Decision block 106 represents a loop that awaits the termination of the phone call.

After the call terminates, the system distributes the call recording to all appropriate interested parties in step 108 (e.g., using one or more forwarding agents). Distribution is preferably performed according to the delivery criteria associated with each forwarding criterion satisfied by the call and/or each interested party receiving the distributed recording.

Preferably, the call recording is enclosed in a security wrapper that verifies its authenticity and guarantees that it has not been tampered with. For example, the call recording may include a header that includes the hash value of the call recording. Of course, other methods of watermarking, authenticating, and/or tamper-proofing the distributed call recording are within the spirit and scope of the present invention.

In addition to providing a digital watermark, hash value, or other security wrapper that guarantees authenticity of the call recording, it may also be desirable to provide a security wrapper that encrypts the call recording such that only authorized persons can access it. One example of such a security wrapper utilizes public/private key pairs. An authorized user may distribute her public key to the system administrator who will then encode all transmissions using the intended recipient's public key. Only the intended recipient can decode the transmission by using her private key—which should not distributed to anyone other than the owner who is the intended recipient. Other known security measures may also be used to help avoid an unintended recipient from intercepting the recording.

It is contemplated that the security wrapper applied to a particular recording may provide only authentication, only encryption, or both authentication and encryption. It should be understood that security wrapper preferences may be included in one or more of the databases, for example as data items in the recipient records stored in the recipients database 22.

The present invention may also be configured to set a status flag in connection with the initiation and/or status of recording activity. For example, a data flag may be set when the recording of the phone call is complete and the call recording is ready to be distributed to interested parties.

Although several embodiments of this invention have been described above with a certain degree of particularity, those skilled in the art could make numerous alterations to the disclosed embodiments without departing from the spirit or scope of this invention. For example, though the present invention has been described in connection with a single phone system server 16 including a single call recording forwarding processor, the methods described above may be executed by one or more computer systems, including suitable input, output, and storage devices or interfaces, and may be software implemented (e.g., one or more software programs or modules executed by one or more computer systems of processors), hardware implemented (e.g., a series of instructions stored in one or more solid state devices), or a combination of both. The computer may be a conventional general purpose computer, a special purpose computer, a distributed computer (such as two physically-separated computers that are linked via an intranet or the Internet), or any other type of computer. Further, the computer may comprise one or more processors, such as a single central processing unit or a plurality of processing units, commonly referred to as a parallel processing environment.

Therefore, it is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of automatically distributing a recording of a call to an interested party, the call being placed by a calling party through an institutional system to a destination number, the method comprising:
   associating forwarding criteria with the interested party;
   establishing the call from the calling party to the destination number through the institutional system;
   recording the call;

determining that the call satisfies the forwarding criteria associated with the interested party;

after the call is completed, based on the determination, automatically distributing the recording of the call to a physical medium via a media burner, wherein the physical medium corresponds to the interested party, wherein the interested party has been approved by a facility administration associated with the institutional system.

2. The method according to claim 1, wherein the associating forwarding criteria with the interested party comprises associating two or more of the following with the interested party: calling party identity, destination number, time of call, and conversation content.

3. The method according to claim 1, wherein the automatically distributing the recording of the call to the interested party further comprises e-mailing a copy of the recording of the call to the interested party.

4. The method according to claim 1, wherein the automatically distributing the recording of the call further comprises:

providing the interested party with access to the physical medium via a courier service.

5. The method of claim 4, further comprising distributing the physical medium to the interested party via mail.

6. The method according to claim 1, wherein the automatically distributing the recording of the call to the interested party further comprises uploading the recording of the call to a website.

7. The method according to claim 1, wherein the automatically distributing the recording of the call to the interested party further comprises providing access to the recording of the call through a voice mail system.

8. The method according to claim 1, further comprising:

establishing a second call from a second calling party to a second destination number through the institutional system;

recording the second call;

determining that the second call does not satisfy the forwarding criteria associated with the interested party; and storing without automatically distributing, the recorded second call into a memory.

9. The method according to claim 1, wherein the associating forwarding criteria with the interested party comprises:

establishing a data record including at least contact information for the interested party and the forwarding criteria; and storing the data record in a recipients database.

10. The method according to claim 1, further comprising enclosing the recording of the call in a security wrapper prior to automatically distributing the recording of the call to the interested party.

11. The method of claim 1, further comprising distributing the physical medium to the interested party at a facility corresponding to the facility administration.

12. The method of claim 1, further comprising:
queuing the recording of the call to the media burner; and
exporting the recording of the call on a scheduled basis to the media burner.

13. The method of claim 1, further comprising:
queuing the recording of the call to the media burner; and
exporting the recording of the call on an on-demand basis to the media burner.

14. A method of automatically distributing a recording of a call to an interested party, the method comprising:

storing a recipient record in a recipients database, the recipient record including identity information of the interested party and forwarding criteria to specify conditions for determining when the recording of the call will be forwarded;

establishing a telephonic connection between a calling party and a called party through an institutional system;

recording the call between the calling party and the called party;

identifying the recipient record whose forwarding criteria are met by information associated with the call;

after the call is completed, based on the identification, automatically distributing the recording of the call to a physical medium via a media burner, wherein the physical medium corresponds to the interested party, wherein the interested party has been approved by a facility administration associated with the institutional system.

15. The method according to claim 14, wherein the automatically distributing the recording comprises:

encrypting the recording of the call using an encryption key to create an encrypted recording; and exporting the encrypted recording.

16. The method according to claim 15, wherein the encryption key is a public key associated with a private/public key system.

17. The method according to claim 14, wherein the associating forwarding criteria with the interested party comprises associating a destination number with the interested party.

18. The method according to claim 14, wherein the associating forwarding criteria with the interested party comprises associating a time of call with the interested party.

19. The method according to claim 14, wherein the associating forwarding criteria with the interested party comprises associating a conversation content with the interested party.

20. The method according to claim 14, wherein the automatically distributing the recording of the call to the interested party further comprises e-mailing a copy of the recording of the call to the interested party.

* * * * *